(12) United States Patent
Wells

(10) Patent No.: US 10,616,263 B1
(45) Date of Patent: Apr. 7, 2020

(54) SYSTEMS AND METHODS OF WEB APPLICATION SECURITY CONTROL GOVERNANCE

(71) Applicant: Wells Fargo Bank, N.A., San Francisco, CA (US)

(72) Inventor: Christopher Patrick Wells, Minneapolis, MN (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 230 days.

(21) Appl. No.: 15/703,294

(22) Filed: Sep. 13, 2017

(51) Int. Cl.
*H04L 29/06* (2006.01)

(52) U.S. Cl.
CPC ...... *H04L 63/1441* (2013.01); *H04L 63/1433* (2013.01)

(58) Field of Classification Search
CPC .......................... H04L 63/1441; H04L 63/1433
USPC ........................................................... 726/25
See application file for complete search history.

(56) References Cited

U.S. PATENT DOCUMENTS

| 7,389,330 | B2 | 6/2008 | Dillon et al. |
| 7,519,976 | B2 | 4/2009 | Blevins |
| 8,130,952 | B2 | 3/2012 | Shamoon et al. |
| 8,520,850 | B2 | 8/2013 | Helms et al. |
| 8,887,154 | B2 | 11/2014 | Eksten et al. |
| 8,910,295 | B2 | 12/2014 | Moore |
| 8,943,599 | B2 | 2/2015 | Guarnieri et al. |
| 9,182,949 | B2 | 11/2015 | Eksten et al. |
| 2014/0082739 | A1* | 3/2014 | Chess .................. G06F 21/577 726/25 |

FOREIGN PATENT DOCUMENTS

WO    2003067852    8/2003

OTHER PUBLICATIONS

Yves et al., Tailored Shielding and Bypass Testing of Web Applications, 2011, IEEE, 2010-218 (Year: 2011).*
Carla Sadtler, et al. "WebSphere Application Server V7.0 Security Guide," IBM International Technical Support Organization, Jun. 2009; retrieved from: http://www.redbooks.ibm.com/redbooks/pdfs/sg247660.pdf.

* cited by examiner

*Primary Examiner* — Brandon S Hoffman
*Assistant Examiner* — Nega Woldemariam
(74) *Attorney, Agent, or Firm* — Walter Haverfield LLP; James J. Pingor

(57) ABSTRACT

Attacks with inserted data may be greatly thwarted with the disclosed innovation featuring systems and methods of using a governor. A governor may act directly in in-line processing to reduce and limit attack surfaces, enforcing validators pre-selected by applications and/or, in the absence of application preselection, selecting and validating validators separately. The applicability of such a technical improvement to system operations improves the technical operations of most any system with one or more applications that accept potential attack surface items, such as data, data fields and/or data types, from "open" or uncontrolled sources.

18 Claims, 7 Drawing Sheets

SYSTEMS AND METHODS OF WEB APPLICATION SECURITY CONTROL GOVERNANCE

BACKGROUND

In the manner that most interconnected modern computer systems operate, there exist system controls and needs for system controls to make sure that operations are, and remain, secure. Much effort is expended to improve actual operations of computer systems that exist in various forms of networks, with interchanges between internal secure systems and open inputs from unvalidated sources from outside of those internal secure systems being a focal point. Events (attacks) may degrade system performance, and optimally, efforts are made to reduce what is known as attack surfaces of the system, such as weak links that may be exploited by attackers. At the crossroads of Security Information Management and Security Event Management lay a field of technical work known as SIEM. Pioneered by companies such as Forsythe, Cisco and Gartner, methods and systems for protection of computer systems present a vigorous area of innovation as improvements in the computer systems themselves and the ability to protect against attacks remain an ongoing concern.

Web application firewalls are known in the art. However as much as these web application firewalls may filter and help reduce attack surfaces, and help stop known vulnerabilities, they are not sufficient to provide governance of the various validators within systems and called by executing applications which themselves may be open to receiving data from clients and users from outside sources (for example, a form on a web page open to the public for the public to enter data into the form). In other words, applications may be built with validators, and it may be known what validators should have done but uncertainty as to validators having done what they should have done exists, and generally there is no governance as to making sure that the validators have actually done what they should have done at or during runtime of one or more applications dealing with external and initially uncontrolled data, data fields and/or data types.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

The innovation disclosed and claimed herein, in one aspect thereof, includes systems and methods that reduce attack surface item risk potential. A system may include one or more webpage/forms that may receive from an external source one or more potential attack surface items; one or more applications that receive potential attack surface items, one or more application services that provide validation of items that represent potential attack surface items; and a governor that intercedes between the one or more webpage/forms and the one or more applications and that controls operation of the one or more applications. The governor identifies, tracks, and matches potential attack surface items to the one or more application services. The governor also associates the one or more application services with the one or more applications, and completes matches to the identified potential attack surface items according to a predetermined set of rules. Validation is verified to have occurred for tracked potential attack surface items, and for tracked items that are validated, application process of the one or more applications may be permitted to continue, else the governor applies a preselected control to the one or more applications limiting internal exposure to the potential attack surface items.

In another embodiment, a system for governing webpage/form applications is disclosed. Such a system may include a data store, a profiler and a validator control component. The profiler may inspect system components to determine attack surface item potential occurrences. The profiler may also identify and catalogue potential attack surface items, identify and catalogue the presence or absence of calls to validating application service item(s) within webpage/form application(s). The profiler may also identify and catalogue one or more webpage/forms, with which may be associated potential attack surface items (for example, data and the like) that may be received from an external source. A profiler may also track and verify items and actions, and log determinations, identification, catalogings, trackings and verifications in a data store. A validator control component may set a control convention for the system, as well as enforce the use of the convention for webpage/form applications and other components within the system. A validator control component may operate a certificate/signatory component that controls webpage/form applications through attestations of validations occurring for the identified, catalogued and tracked attack surface item potential occurrences. For tracked items being validated, the validator control component may provide permission for webpage/form applications to continue, else the validator control component may apply a predetermined controls and/or rules thereby limiting internal exposure to the potential attack surface items.

In another embodiment, a method for reducing attack surface item risk potential is presented. The method reads and/or interrogates one or more applications and one or more webpage/forms associated with the one or more applications. Potential attack surface items presented in the one or more webpage/forms are demarcated. Validators are resolved by tracking and verifying application treatment of potential attack surface items being matched to predetermined validators, enforcing a control convention that controls the one or more applications, and determining, that validating has occurred, If validators have properly validated demarcated potential attack surface items, one or more application may be permitted proceed. Else, predetermined selected controls may be applied to the one or more applications and to the potential attack surface items.

In another embodiment, a non-transitory computer-readable medium configured to store instructions, that when executed by a processor, perform operations including one or more of the system and method steps.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
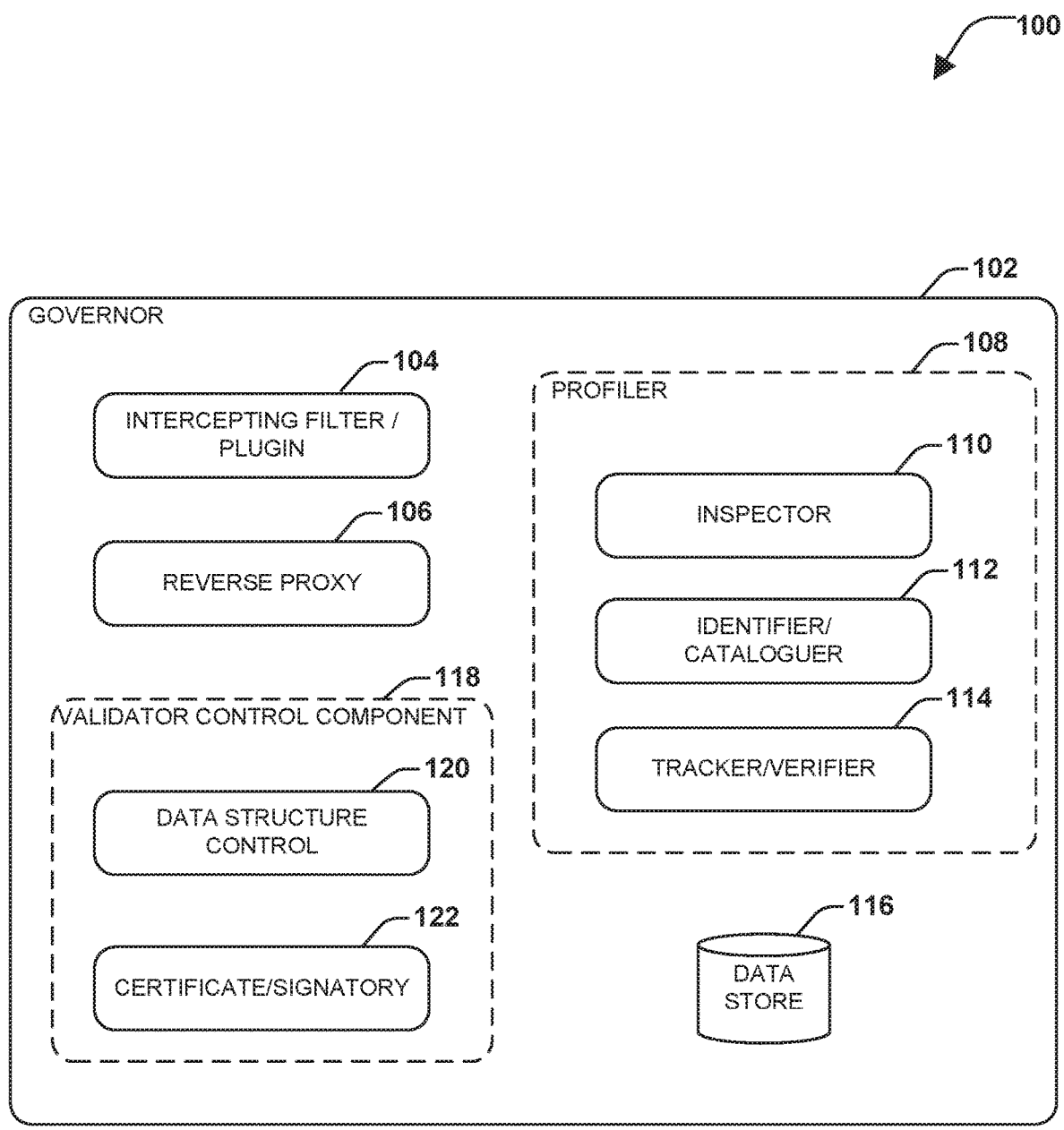
FIG. 1 is an illustration of example system components, according to one or more embodiments.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. While specific characteristics are described herein, it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, the claimed subject matter can be implemented as a method, apparatus, or article of manufacture using programming or engineering techniques to produce software, firmware, hardware, or most any combination thereof to control a computer to implement the disclosed subject matter. The term "article of manufacture" as used herein is intended to encompass a computer program accessible from most any computer-readable device, carrier, or media. It is appreciated that embodiments are presented as a specific, non-limiting, examples of the innovation. Other embodiments are contemplated as well and intended to be included within the scope of this disclosure and claims appended hereto.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

With reference now to the figures, FIG. 1 is a high level illustration of an example system 100. In system 100, governor 102 is pictured as having a number of subcomponents. It is to be appreciated that the subcomponents may vary by embodiment, and certain subcomponents pictured with dotted lines may comprise components that may be integrated or may be persist separately on their own within governor 102 or may be standalone components in communicative connection with governor 102.

It is also to be appreciated that there exist a multitude of embodiments in which governor 102 may be implemented in different manners. Governor 102 in most any implementation will be in the line of action between a client/user and that client or user's computing device, which may include inputs of data, data fields and/or data types (for example, into a webpage/form), and the one or more applications (to which such a webpage/form would be associated with), as will be discussed later in regards to FIGS. 2 and 3. Further, it is to be appreciated that embodiments of governor 102 may be implemented as an intercepting filter/plugin 104 or written as a plug-in for shell-scripting, (i.e. a reverse proxy 106). The disclosed innovation provides that the form of the governor 102 may be a singular component or may be in the form of distributed components. In an embodiment of distributed components, it is recognized that modern web servers provide plug in functionality at multiple layers. Alternatively, governor 102 may be implemented as a reverse proxy configuration 106, for example, implementation may be as written as a set of regular expression type codes, executing via a processing unit on a computer, for example, within ModSecurity (provided with Rules Framework) or for another example, in shell scripting language attached to a web search framework attached as a reverse proxy. The disclosed innovation is contemplated to be provided in other implementations (for example, as a dedicated hardware ASICS), although not shown. Embodiments may vary based on implementation of governor 102 between one or more applications and external facing webpage/form(s) related to one or more applications.

The innovation may be contrasted with firewalls, and it should be appreciated that while governor 102 may occupy a similar place as a Local Authentication Plugin ("LAP"), an Access Policy Manager (associated with F5) or other reverse proxy protections, the actions of governor 102 as disclosed herein, distinguish from these other forms of system protection and disclose that governor 102 is different than a firewall. For example, governor 102 is aware of and controls the contents of Xheaders, can use tools to read and writer Xheaders, and further organizes and uses these tools in a specific manner (through the validators control component 118 discussed later) to control the content and the meaning of the content of Xheaders, for example.

Generally, the innovation deals with the problem of trusting data and the like from external sources that have not been validated. The innovation discloses that it is desired to run data, data fields and/or data types through some security control in order to reduce attack surfaces of a system. Trust problems may often be aggravated by application developers internal to a system who may lack security concerns as part of their development efforts, often focusing more on intended application functionality. Governor 102 provides a way to declare upfront expected security requirements to be followed by downstream applications and to govern what data points and the like security would be applied to, to govern interactions after one or more applications process the prior unvalidated data, data fields and/or data types and to verify and provide assurance that a valid security control was used for the particular vulnerability or requirement that is predetermined for the one or more applications' particular treatment of the data, data fields and/or data types. Governor 102 may reduce a web application's attack surface by holding web applications accountable for security controls they apply and validations they perform.

In an embodiment, governor 102 may comprise a profiler 108, which may examine profiles of one or more applications and identify basic security requirements within the one or more applications. Further, a subcomponent to profiler 108, inspector 110 may inspect the one or more applications beyond the application profile, may inspect calls an application may make for incoming data and the like, as well as may inspect most any related web pages or forms that may be generated or may be used or associated with the one or more applications. Identifier/cataloguer 112 may identify and catalogue downstream validators and Xheaders, for example, related to one or more applications, as well as identify and catalogue upstream data, data fields and data types.

Governor 102 is not limited to being used with applications developed with profiles (for example, use with one or more applications created with no profiles is contemplated), and may be used with one or more other applications concurrently. It is to be appreciated that for applications developed without profiles, governor 102 and profiler 108 may be enabled to inspect such applications and obtain information that may typically be located within a proper application profile. Inspector 110 and identifier/cataloguer 112 may interrogate data, data fields and/or data types in the one or more applications and create appropriate records that provide for alignment with appropriate validators.

Tracker/verifier 114 may also track the instances of data, data fields and data types in each of the items that profiler 108 investigates. Records, as may be created by inspector 110, identifier/cataloguer 112 and tracker/verifier 114 may be stored in data store 116. Tracker/verifier component 114 may record all incoming, untrusted, data fields presented to an application (in live-time running), and governor 102 may process down-stream applications to provide proof that those untrusted fields are properly validated by approved validators (again, in live time running), prior to allowing untrusted data ingress into other internal system components (not pictured).

While data store 116 is shown as a subcomponent of governor 102, in some embodiments, data store 116 may be a separate component within a larger system 100 and may be communicatively connected to governor 102. It is contemplated that data store 116 may also provide an active log for most any controls and rule sets stored in data store 116.

Figure 2:
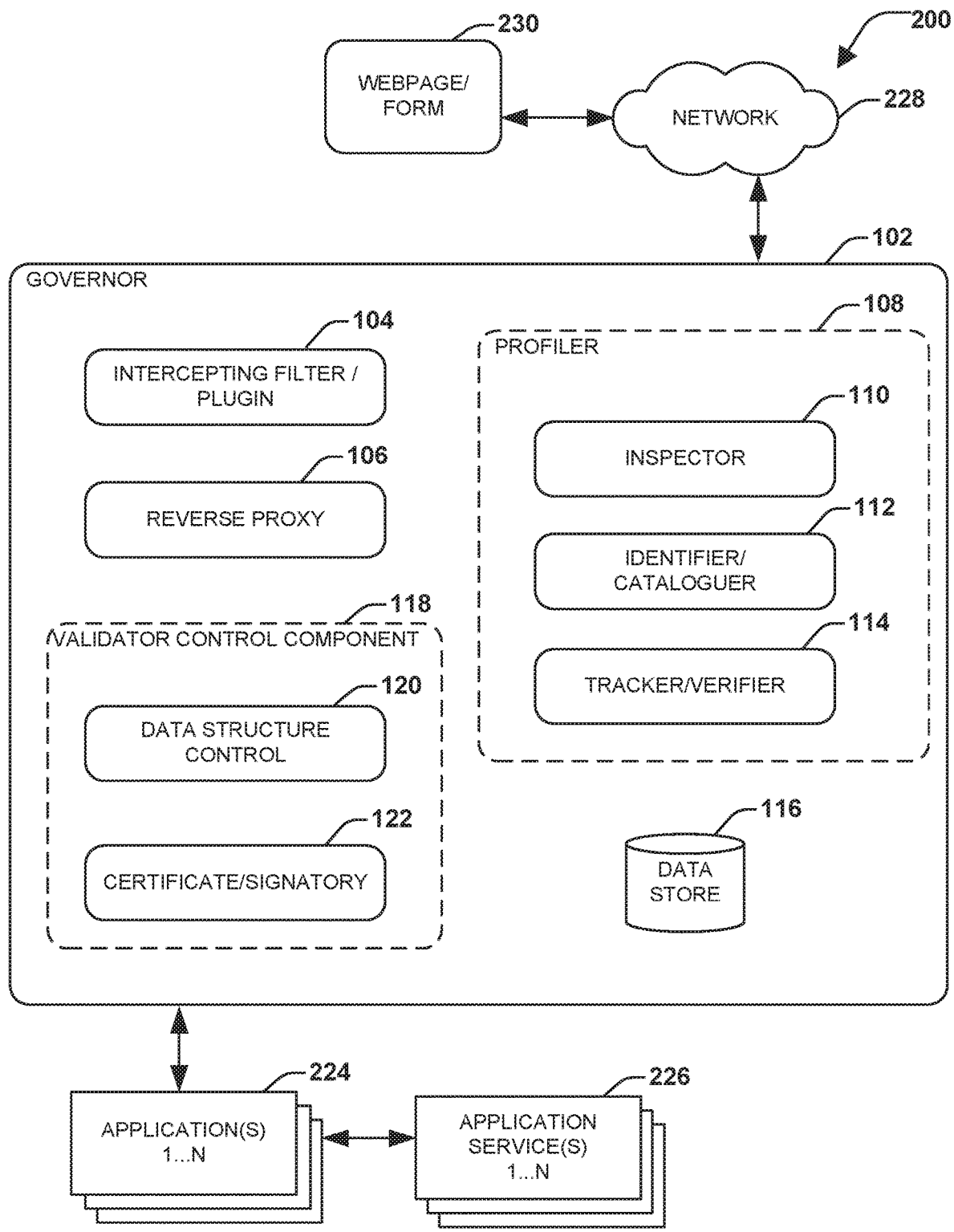
FIG. 2 is an illustration of a high level example system with in accordance with one or more aspects of the disclosure.
Figure 3:
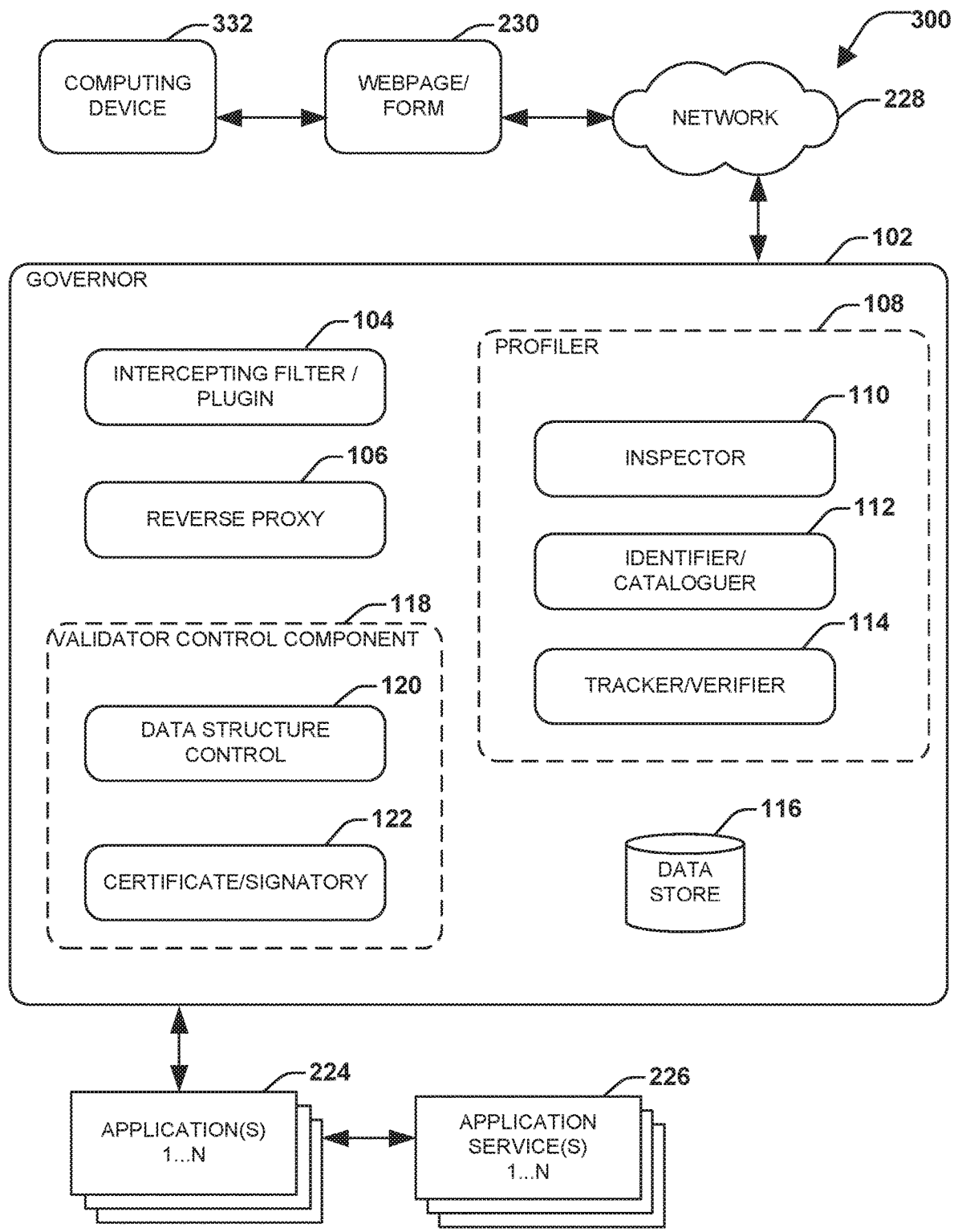
FIG. 3 is an illustration of a high level example system with in accordance with one or more aspects of the disclosure.

In an embodiment, governor 102 may perform tasks through validator control component 118. Validator control component 118 may be comprised of subcomponents data structure control 120 and certificate/signatory 122. Data structure control 120 may use existing tools, for example ModSecurity, in order to use pathway (Xheaders) in a novel manner. It is to be appreciated that it is the manner of using pre-existing tools that is novel, as while ModSecurity may be known in the art, and known to provide tools for reviewing, reading and writing of Xheaders, the innovative aspects disclosed herein are directed to novel structuring and controlling the content of, for example, Xheaders and the use of the Xheaders across system components (for example, system 100 as shown in FIG. 1, system 200 as shown in FIG. 2 or system 300 as shown in FIG. 3).

ModSecurity does not control what is obtained and controlled in the Xheaders, but instead aspects are controlled by governor 102. The disclosed innovation provides that governor 102 may create and control a convention (or control convention) to ensure that all applications and other services downstream are aligned with the governance supplied by the governor 102 through data structure control 120.

Earlier, governor 102 was contrasted with web application firewalls as a form of protection, and it is to be appreciated that governor 102 is more capable than a mere firewall in that governor 102 has knowledge of firewalls that may be present (through profiler 108 and inspector 110); knowledge of all incoming request and expected data, data fields and data types (that may require validation), as well as knowledge of application configuration file data, and may programmatically (live) separately make up for application deficiencies (missing or improper validators) through validator control component 118 and may apply rules for data, data fields and data types as captured in data store 116 for dynamic application and inline use and correction.

In an embodiment, validator control component 118 may obtain proof that down-stream applications and services properly performed predetermined proper validations. Data structure control 120 may create a convention for creating and treating Xheader content and may enforce the convention to ensure that Xheaders and contents of Xheaders are universally applied in a system (for example, system 100 of FIG. 1, system 200 of FIG. 2, or system 300 of FIG. 3). Data structure control 120 thus may enforce controlling protocol throughout the one or more applications and one or more application services, including validation services, as will be discussed herein and in relation to governor 102's placement in FIG. 2—that is, disposed between a one or more applications and a one or more webpage/form.

Certificate/signatory 122 may generate unique digital signature requests for identified validators, forward the signature requests to validators and process digitally signed fields as an attestation of those validations having been performed by the validators, and which were indicated to be performed by one or more applications; thereby insuring that such security controls were indeed performed. Certificate/signatory 122 may interact with profiler 108 to provide internally controlled certificates to most all determined validators (of the one or more applications) for each of data, data fields, and/or data types that are introduced from outside of the internal system for the one or more applications. Profiler 108 may determine the validators per the one or more applications or in some embodiments, the validator control component 118 may augment the application listing of validators with additional validators to match the full list of data, data fields and/or data types that inspector 110 and identifier/cataloguer 112 may have determined and stored in data store 216. Digital certificates may then be routed to each validator. Validators may then process digital certificates with their private keys and return a signed digital certificates back to the governor 102 through data structure control 120 (for example, through the controlled Xheader tools). Governor 102 may use identifier/cataloguer 112 and tracker/verifier 114 with data store 216 and match and ensure that most all identified external and uncontrolled data, data fields, and/or data types have been validated.

In this manner, validator control component 118 verifies that most all of the data, data fields and or data types (captured by profiler 108) have been properly validated by verifying digital signatures applied by validators, processed through signatory 122, in conjunction with tracker/verifier 114 and data store 116. The disclosed innovation provides that prior to one or more applications continuing to otherwise process incoming data (and one or more applications continuing their own processing that may eventually provide the one or more application's functionality—including most any response being returned to the client/user using, for example, computing device 332 as will be discussed in relation to FIG. 3 later), governance may prevent most any "clever" applications from attempting to shortcut data, data field or data type validations, as inspector 110 of profiler 108 may catch data missing from an application profile, perhaps in an unintended attempt to bypass validator calls, and the disclosed innovation may still have governor 102 process proper validations.

In other words, governor 102 may inspect most all requests and responses made of an application through inspector 110. Governor 102 may identify and enumerate most all untrusted data through profiler 108, and may govern one or more applications to make sure that one or more applications have, and apply (or are made to apply), appropriate validators per data, data field and/or data type per application rules or per predetermined rules which may be stored in data store 116.

In another embodiment, governor 102, through profiler 108 may preserve original requests and data, data fields and/or data types, even if one or more applications treat certain data, data fields and/or data types as not being validated (if, for example, an application attempts workarounds from validation protocols). In such cases governor 102 may determine a proper validator within the system (for example, looking up a match or rule in data store 116) and engage the validator directly. Tracker/verifier 114 keeps tracks of these separate from most any profile that may exist in one or more applications and ensure that validators (or other application services that may serve the function of controls) perform either per the one or more applications, or, if proper validator calls are missing, per rules in data store 116. This ensures proper validation and ensures that the one or more applications do not engage in shortcuts, wherein data, data fields or data types are left unvalidated (and which may present an open attack surface).

In an embodiment in which one or more applications are introduced "cold," profiler 108, through inspector 110 and identifier/cataloguer 112 may review application profiles that may provide a data listing, as well as review the one or more applications themselves and determine most any such items that might be missing from an application profile. Governor 102 can also be presented "cold" with one or more new applications (for example, third party applications being integrated into an internal system, that may not have been developed with a profile), and governor 102 can interrogate the one or more new applications for a number of items, as disclosed herein.

In another embodiment, Governor 102 may also augment validations if any application is not built to so have validators. That is, if the one or more applications is lacking proper validators (or calls to proper validators) for the types of data, data fields and/or data types that the application interfaces with from outside of the trusted system, governor 102 may augment the application. Even if a new application is presented directly to the Governor 102 and that new application has not been properly developed (for example, perhaps the application does not have a proper profile or perhaps has an incomplete profile), Governor 102 may still evaluate fields of the one or more applications and of an associated webpage form, may identify and catalogue data fields and the like that would introduce uncontrolled (unvalidated) data and the like, and may control the provisioning of validators and certificate/signatories that serve to validate the validators to verify validation work of application services as having been completed. In this manner, governor 102 may perform with both internally developed and externally developed applications.

In other embodiments, Profiler 108 may work with tracker/verifier 114 and data store 116 in situations in which multiple applications may be interacting, and to profile, capture and apply validators present in one application to items reflected in other applications in which the data, data fields or data types are also present. Identifier/cataloguer 112 may also be able to interrogate the webpage/form (for example webpage/form 230 as will be discussed later in FIG. 2), and determine data, data fields and/or data types therein which may require validation. Tracker/verifier 114 may be aware of most items that have come in (i.e., unvalidated data), and may note that most all of such may also be handled on the way out (for the one or more applications to be allowed to continue processes incoming data), In effect, governor 102 may ensure that the one or more applications have not engaged in shortcuts or misses in the validations (on the backend). This may reduce attack surfaces because data, data fields and/or data types are ensured to be validated. The disclosed innovation provides that such controls by governor 102 may reduce computational overhead within and between applications, in that tracked and verified items need not be validated multiple times if used in multiple applications. In other words, governor 102 may determine from profiler 108 that multiple applications may be involved in the interaction with a client or user (for example, through computing device 332 which will be described in more detail in relation to FIG. 3), and may "piggyback" validations from one application to another to verify that data is being validated properly.

Data structure control 120 may control structuring and content in most any variety of internal (and externally developed, but internally integrated) applications (for examples applications(s) 224) and one or more application services (for example applications service(s) 226), as well as webpage/form Xheader designations (from for example, webpage/form 230) that reflect and provide external inputs into internalized applications. It is by particular and controlled manner of controlling Xheader content and structure (for example) across most all internal applications and application services that thereby ensures that these tools are being used in a particularly structured manner in order to provide the governance and oversight of validating predetermined validators (as will be further discussed related to FIGS. 2 and 4).

In other embodiments, governor 102 may also be able to assist with provisioning of micro services. For example, a governor 102 may assist development of one or more applications to find proper validators for data fields within the one or more applications, and in those instances of development (and/or live operations), where multiple applications may be interacting, governor 102 may be able to reduce development bloat by consolidating validators to be used across multiple applications. One or more applications in group use would then have access to validations centrally controlled by governor 102.

It is contemplated that one or more applications may also use other internal services to perform validations. Governor 102 may first look to one or more applications for responsibility for providing an associative digital signature of a validation service that performs a validation (either directly or by proxy) for items related to the one or more applications, as Governor 102 maintains control of allowing the one or more applications to proceed. Governor 102 maintains "basic accounting" with data, data fields and/or data types, and if most all validations are not properly performed with proper validators, the governor 102 may hold the response, log the incident, both, or take other predetermined actions as may be captured in a rule set in data store 116.

It is to be appreciated that assigning, storing, issuing and other actions by governor 102 may be enacted in a number of manners and a variety of implementations are possible concerning security cryptographic features (such as signing and storage and issuing of certificates). Existing certificate services or customized services may be invoked; validation of signatures may be done by a separate service or by governor 102 or its components.

As will be discussed in more detail in regards to method 400 in FIG. 4 later, validator control component 118 controls and reduces attack surfaces based on a path of uncontrolled data entering one or more applications internal to a system. Briefly, governor 102 creates a verification that existing validators have actually performed appropriate validations across all tracked "uncontrolled" data prior to an application being permitted to process and internalize data and the like. This process greatly reduces outside attack surfaces to internal systems and applications operating within internal systems that interact and obtain data from external sources.

Turning now to FIG. 2, illustrated are example system components, according to one or more embodiments 200. The innovation is now described with reference to the drawings, wherein like reference numerals are used to refer to like elements throughout. In an embodiment, Governor 102 is as described in relation to FIG. 1. Embodiment 200 illustrates one or more applications 224 interacting with governor 102, as well as one or more application services 226. Another aspect of the disclosed innovation is that governor 102 (and its subcomponents) may interface with one or more applications 224 and inspect, identify catalogue and track instances of calls of data, data fields and data types that may be used in the one or more applications as well as one or more application services 226 in a chain fashion (as pictured) or directly (not pictured). Applications may also interact with other internal system services and resources and governor 102 may reach through an application to other service items (for example, validation services), in processing Xheaders and issuing private certificates and private keys as well as retrieving responses from the services. FIG. 2 highlights an embodiment of a general interposition of governor 102 between a potential attack surface of data, data fields, and/or data types (through network 228) within webpage/form 230 and one or more applications 224 and associated one or more application services 226.

Embodiment 200 also illustrates governor 102 may similarly interface with a network 228 and a webpage/form 230 which may be presented through the network to external entities as will be discussed in FIG. 3. Data, data fields, and/or data types in webpage/form 230 may present a possible attack surface of unauthenticated or unverified external sources and ingress into a system. It is contemplated that one or more applications 224 may or may not be developed internally and may or may not have properly formatted profile sections. It is also contemplated that the one or more applications 224 may rely on one or more applications services 226. The one or more application services 226 may include validators. One or more applications 224 and one or more application services 226 may adhere to a validator control component 118 protocol for data structure control 120 and may interact with certificate/signatory component 122. While governor 102 may validate validators of improperly formed or developed applications, it is to be appreciated that it will be typically applications that are responsible for ensuring that each field is validated and then attesting via response to data structure control 120 (through for example Xheaders or cookies) that each data, data field and/or data type has been validated.

Embodiment 200 illustrates various interactions as governor 102 being implemented in-line upstream from one or more applications that interface and obtain external data. It is to be appreciated that one or more applications 224 are a main path through which one or more application services 226 (including at least validation services) are interacted. Validation services (of the one or more application services 226) may validate identified and tracked data, data fields, and/or data types and may provide digital signatures as an attestation to performance of a validation.

As discussed with system 100 of FIG. 1, issue of private certificates from certificate/signatory 122 may travel through XHeaders (as may be set by data structure control 120), and signed certificate along with private keys may be returned from validation services of one or more application services 226 to verify governance has been successful. A listing for matching validators with desired types of data, data fields and/or data types to be validated may be stored in data store 116.

As illustrated in FIG. 2, governor 102 is interposed between one or more applications 224 and a network 228, which leads to an externally facing webpage/form 230. As discussed in FIG. 1, profiler 108 (and its subcomponents) may also be able to inspect, identify, catalogue and track data, data fields and or data types across network 228 and to the webpage/form 230. Validator control component 118 may also extend the operation of its subcomponents and their control to webpage/form 230 through network 228.

Turning now to FIG. 3, illustrated are further example components according to one or more embodiments 300, specifically here is an addition of computing device 332. The innovation is now described with reference to the drawings, wherein like reference numerals are used to refer to like elements throughout. In an embodiment, Governor 102 is as described in relation to FIG. 1. Internal system components are as described in relation to FIG. 2.

As shown, computing device 332 interacts with webpage/form 230 which, over network 228, interacts with governor 102 in between one or more applications 224. It is to be appreciated that it is at computing device 332 that external and unvalidated data, data fields, and/or data types through a request through webpage/form 230 may be encountered and present an attack surface. Governor 102 may inspect, identify, catalogue, track and verify webpage/form 230 as well as profiles of one of more applications 224, as well as the one or more applications 224 themselves, for potential attack surface items. Data, data files, and/or data types from external sources may be treated initially as not having been authenticated or verified. Such items may, for example present on most any interactive web page, and for another example be received from a user or client filling out information (for example, information related to a loan application). The disclosed innovation protects and ensures governance of validators that protect internal systems from potential attack surface items apart from and possibly in addition to other protection services (for example, firewalls and virus protection programs).

Another aspect of the disclosed innovation is that it may be utilized to improve development of one or more applications 224 that may have outward facing interactions (ie., an ability to accept un-authenticated or non-verified data, data files and/or data types) may be operated either or both prior to active availability over a network 228 to a client or user computing device 332 or during live interactions with the client or user computing device 332.

System improvements available because of the disclosed innovation include providing a more robust development environment as an added governance may compensate for developers who may merely give a cursory view to security concerns, and may even view such as a hindrance to their functionality aesthetics. An aspect of the innovation is that a governor 102 may serve as a safety mechanism for internal developers who may otherwise overlook (or even attempt to evade properly compensating for) attack surface as represented by data, data fields and or data types that may be migrated into an internal system by way of applications with open faces to such unauthenticated or unverified data and the like.

Figure 4:
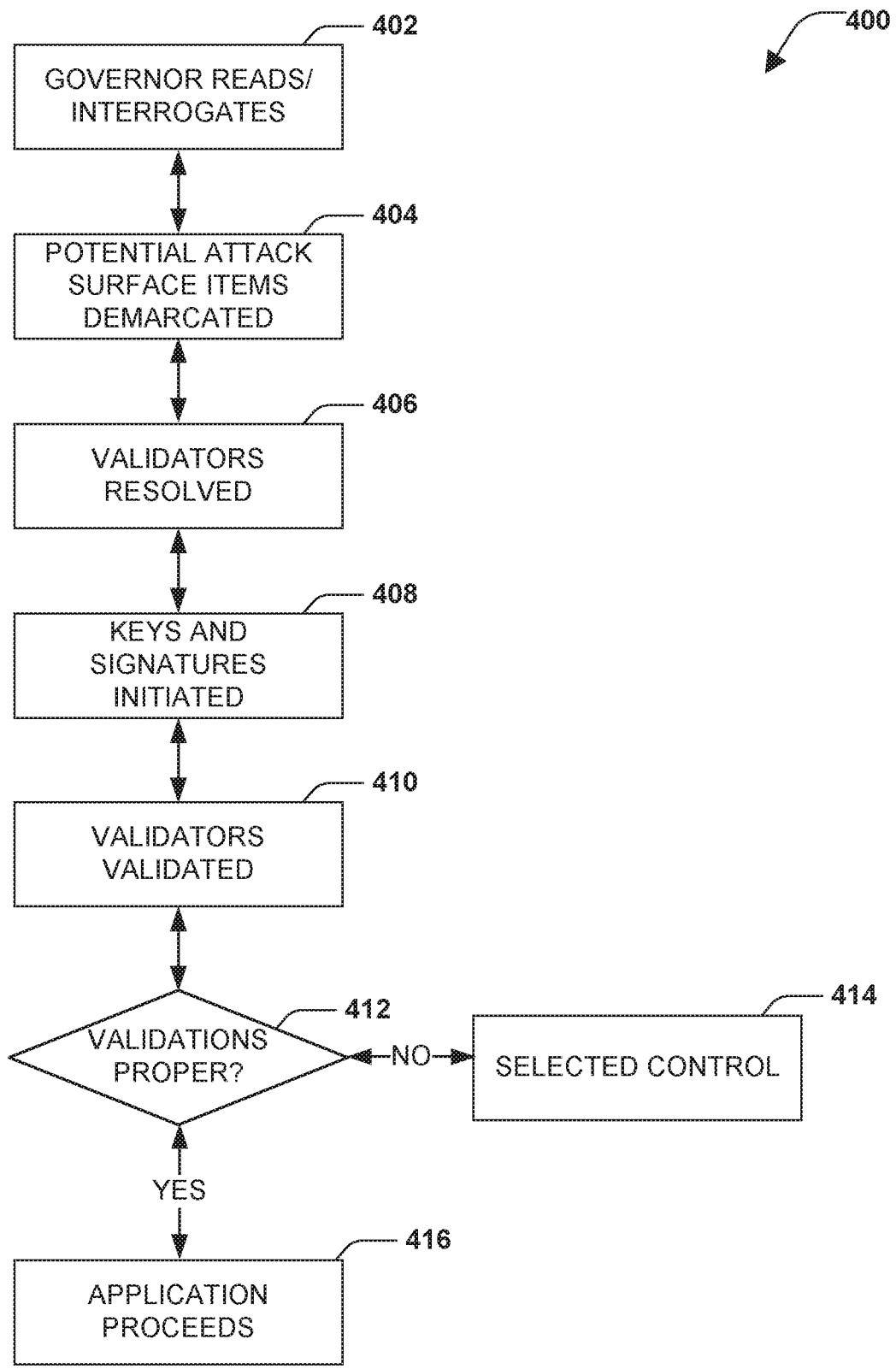
FIG. 4 is an embodiment of a method 400 of governance for application security control, according to one or more embodiments.

Turning to FIG. 4, on embodiment of a method 400 of governance for application security control, is presented according to one or more embodiments. Another aspect of the disclosed innovation is a method undergoing action in live time interaction with one or more applications and an outside user or client as may be shown in system 300 of FIG. 3. At step 402 a governor (for example governor 102) may execute and read and interrogate other system components. Execution may include enacting a profiler, for example, profiler 108, to inspect, identify, catalogue and track instances of data calls, presence of data fields and/or data types both in one or more applications (for example one or more applications 224) as well as similar items in an outward facing webpage/form (for example component 230) exposed to outside users or clients through client or user computing devices (for example 332).

At step 404 data, data fields and/or data types may be demarcated and records may be created or updated, for example, records may be created or updated in data store 116. It is to be appreciated that a profiler, for example profiler 108 of system 100, may be used to demarcate potential surface attack items as determined from one or more applications, for example one or more applications 224 as well as from webpage/form(s), for example webpage/form 230.

At step 406, validators may be resolved. As discussed herein, resolution of validators may involve inspecting one or more application profiles, as well as determining validators for items not covered in one or more application profiles, but reflected in one or more applications themselves. As discussed herein in relation to system 100 of FIG. 1, determination of validators may involve predetermined rules which may be present in data store 116.

A governor such as governor 102 may invoke validator control component 118 and capture, through a data structure control 120, actions of certificate/signatory 122 that at step 408 initiates keys and private signature requests to the searched and controlled list of validators per step 406 and which may be stored in data store 116. In an embodiment, governor 102 may issue private certificates and upon completion, Xheaders may be signed in response (with a private key from a validator with a provided certificate). Governor 102 may have most all related validator public keys, and may use public keys, checks of X headers and (private key) signature verifications to govern.

At step 410 and as discussed in regards to system 100 of FIG. 1 previously, data structure control 120 and certificate/signatory 122 may control sending and receipt of attestation controls from validators attesting to a fact that indicated validations have been actually completed, with controls thereby enforcing validators for identified and catalogued instances as presented by webpages/form 230 and one or more applications 224.

At step 412 a governor, for example governor 102 of system 100, would evaluate whether most all validations as may be identified and catalogued as having been properly attested by validator control component 118 in prior steps, and if the validations are determined to not be proper, then selected controls at step 414 may be enacted. It is contemplated that selected controls may vary per implementation, and may include such action as freezing action of one or more applications, requesting some secondary attestation, notifying internal and or external client user that some predetermined action may be required or some combination of these or other actions. In other embodiments, selected controls may vary according to various rules that may be captured or stored in a data store, for example data store 116 and may provide a range of control responses from provisions of warning flags for low risk items, to helpful suggestions for proper data, use of data fields or data types for errors of form, or in other embodiments, a warning and or a shutdown of an application and quarantining of data date files or data types that do not meet proper validator controls.

If validations are determined to be proper, then application proceeds at step 416. The disclosed innovation provides that logging of both achieving proper validations or not achieving proper validations may be performed and stored in a data store, for example, data store 116.

Another aspect of the disclosed innovation is that at step 416 external source data that had been previously considered un-authenticated or non-verified, may be deemed to be authenticated or verified. In some embodiments, items may be provisionally authenticated and remain tracked for data control purposes.

Figure 5:
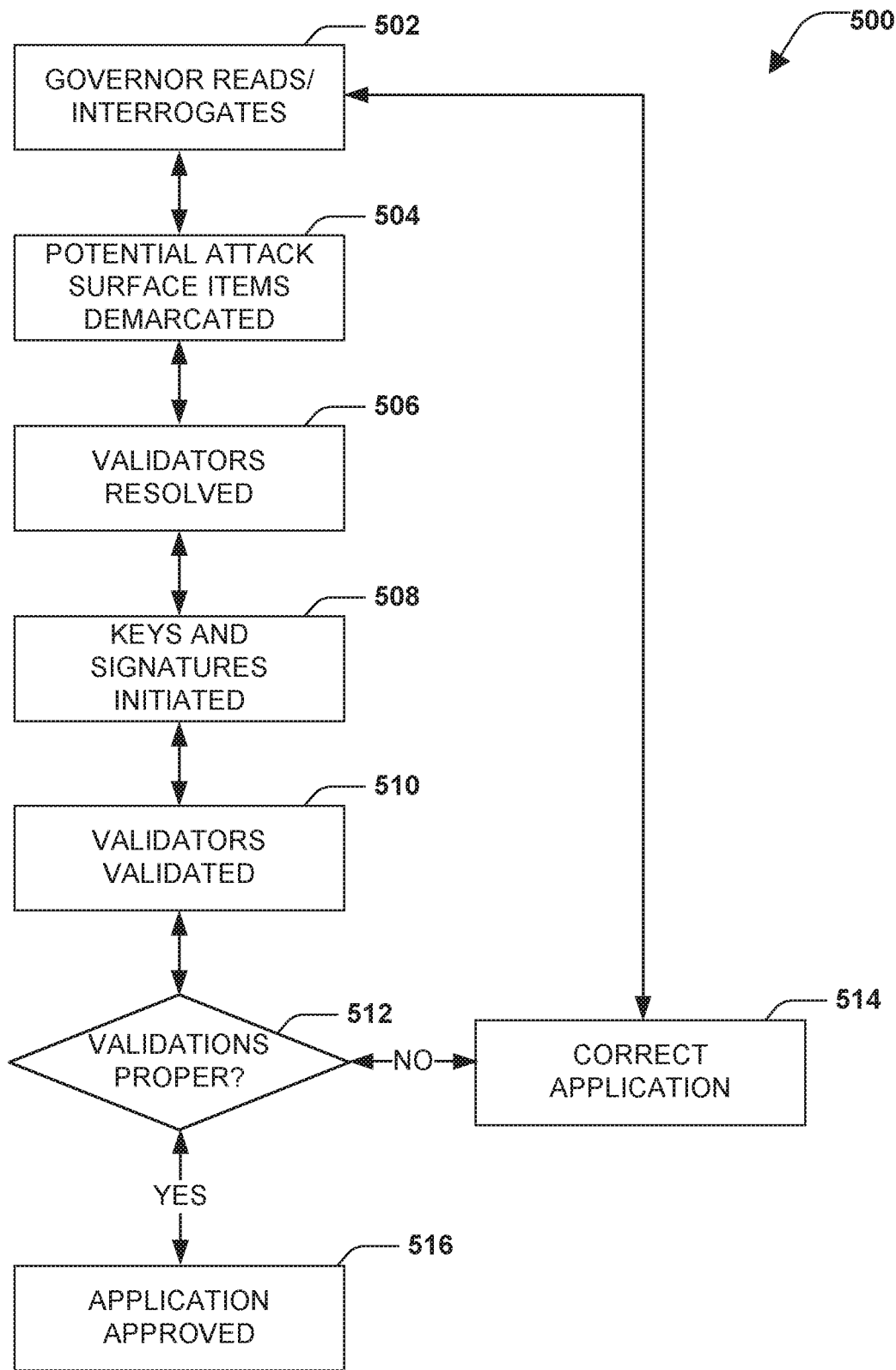
FIG. 5 discloses an embodiment of a method 500 of application development and integrating governance for application security control, according to one or more embodiments.

FIG. 5 discloses an embodiment of a method 500 of application development and integrating governance for application security control, according to one or more embodiments. The disclosed innovative method may provide governance to protect systems that employ one or more applications which may be exposed to potential attack surface items (for example, un-authenticated data, data fields, and/or data types). Method 500 may be employed in a system such as system 200 of FIG. 2 in which the system has not yet "gone live" and maybe exposed to outside users or clients and their computing devices (as discussed in regards to FIG. 3). Such a method may permit more leeway for developers to focus on functionality while developing applications (or converting third party developed applications) while also ensuring that security concerns as may be reflected by the disclosure of the innovation are still captured and integrated into a more developed application.

At step 502 a governor (for example governor 102) may execute and read and interrogate other system components. Execution may include enacting profiler 108 to inspect, identify, catalogue and track instances of data calls, presence of data fields and/or data types both in one or more applications (for example one or more applications 224) as well as similar items in an outward facing webpage/form (for example component 230) which is expected to be exposed to outside users or clients.

At step 504 potential attack surface items (for example, data, data fields and/or data types that may be introduced into a system from an external client/user) may be demarcated and records may be created or updated, for example, records may be created or updated in data store 116. A profiler, for example profiler 108 of system 100, may be used to demarcate potential surface attack items as determined from one or more applications, for example one or more applications 224 as well as from webpage/form(s), for example webpage/form 230.

At step 506, validators may be resolved. As discussed herein, resolution of validators may involve inspecting one or more application profiles, as well as determining validators for items not covered in one or more application profiles, but reflected in the one or more applications themselves. As discussed herein in relation to system 100 of FIG. 1, determination of validators may involve predetermined rules which may be present in data store 116.

A governor such as governor 102 may invoke validator control component 118 and capture, through a data structure control 120, actions of certificate/signatory 122 that at step 508 initiates keys and private signature requests to searched and controlled list of validators per step 506 and which may be stored in data store 116. In an embodiment, governor 102 may issues private certificate and upon completion, Xheaders may be signed in response (with private key from validator with a provided certificate). Governor 102 may have most all related validator public keys, and may use public keys, checks of Xheaders and (private key) signature verifications to govern.

At step 510 and as discussed in regards to system 100 of FIG. 1 previously, data structure control 120 and certificate/signatory 122 may control sending and receipt of attestation controls from validators attesting to a fact that indicated validations have been actually completed, with controls thereby enforcing validators for identified and catalogued instances as presented by webpages/form 230 and one or more applications 224.

At step 512 a governor, for example governor 102 of system 100, would evaluate whether most all validations as may be identified and catalogued have been properly attested by validator control component 118 in prior steps and if the validations are determined to not be proper, then selected controls at step 514 may be enacted. Selected controls may vary per implementation, and may include such actions as modifying applications to insert predetermined validator calls, referencing predetermined validator calls in instances in which more than one application is to be executed, and one application may "piggyback" on another application, noting to application developers that a validation issue may exist (and freezing action of such application until a developer clears a flag and amends the application to include a validation), or some combination of these or other actions. In other embodiments, selected controls may vary according to various rules that may be captured or stored in a data store, for example data store 116 and may provide a range of control responses from provisions of warning flags for low risk items, to helpful suggestions for proper data, use of data fields or data types for errors of form, or in other embodiments, a warning and or a shutdown of the application and quarantining of data, date files, and/or data types that do not meet proper validator controls.

If validations are determined to be proper, then application proceeds at step 516 and is noted at compliant. Logging of remedial actions (or logging of remedial action not taken) may be performed and stored in a data store, for example, data store 116.

The disclosed innovation provides that at step 516, an expected external source data and the like that may be considered un-authenticated or non-verified, may be deemed to be sufficiently governed without requiring authentication or verification. In some embodiments, the items may be provisionally authenticated and remain tracked for data control purposes. This aspect of the disclosed innovation improves computer systems by providing a degree of robustness against potential attack surface items.

Another aspect of the disclosed innovation is that even after governor 102 has been activated (whether in development mode or in live time run mode), an ability of governor 12 and specifically, profiler 108 to inspect, identify, catalogue, track, and verify may provide additional system improvements. For example, methods of applying forensics to a system, such as system 300 of FIG. 3, in which live time processing has been initiated are enabled with the disclosed innovation.

Even for approved applications or applications operating with validator control component that compensate for applications in which deficiencies may exist, external efforts to corrupt or attack systems may arise and in instances where a new weakness or vulnerability may occur, logging and enabling of traceability of a new fail point in validators and an ability to track potential attack surface items (for example which specific data, data field or data type may be involved in an attack), are benefits of the disclosed innovation. Attackers may find a chink that allows them to insert data and the like in a way in which a validator (for whatever reason) was not activated and newly inserted data may remain unvalidated data. A governor, such as governor 102, may then force even newly inserted data back to be properly validated, and a specific new validator may be provided to compensate for the new type of data insertion.

Figure 6:
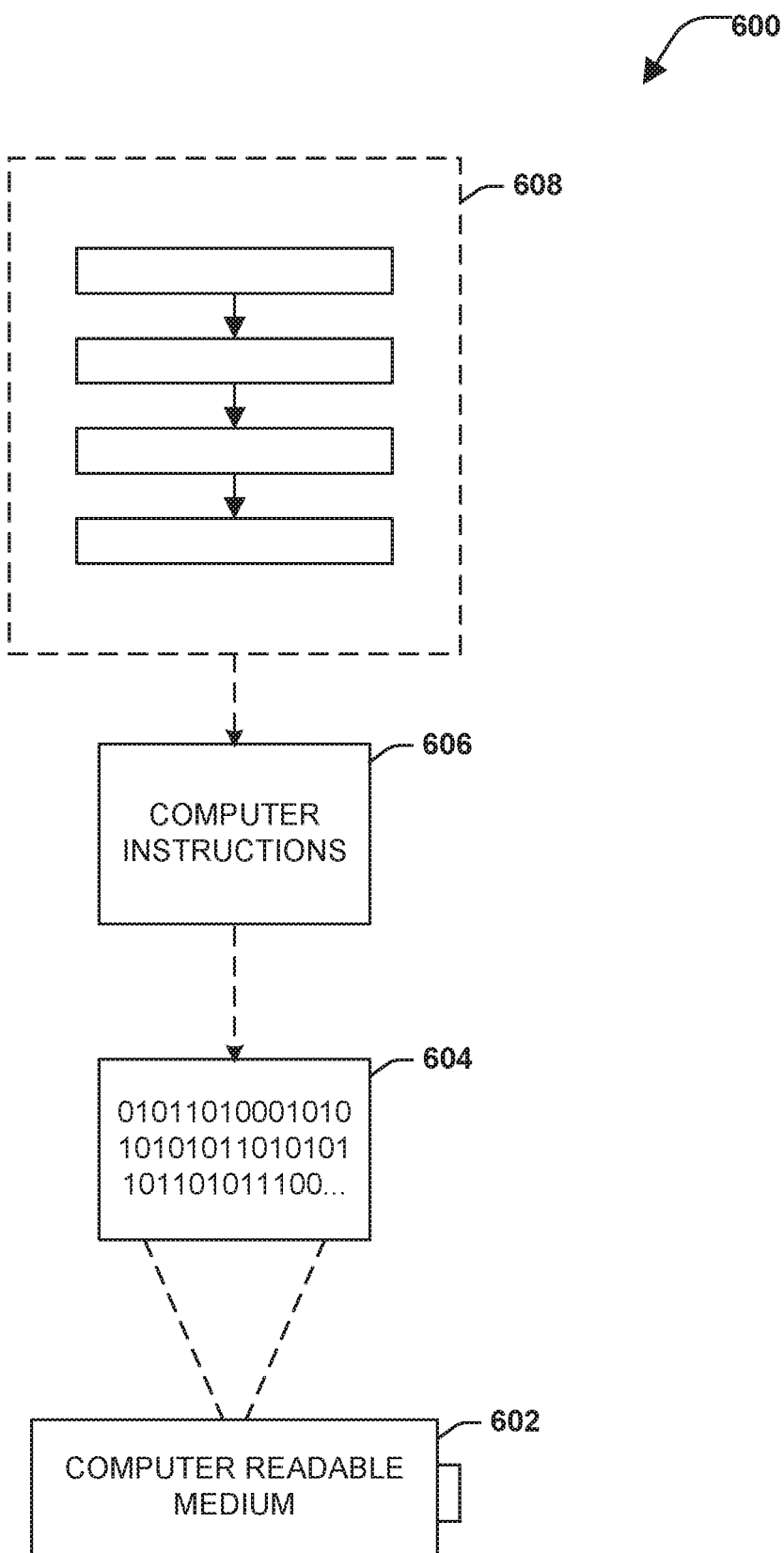
FIG. 6 is an illustration of an example computing environment where one or more of the provisions set forth herein can be implemented, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 6, wherein an implementation 600 includes a computer-readable medium 602, such as a CD-R, DVD-R, flash drive, a platter of a hard disk drive, etc., on which is encoded computer-readable data 604. This computer-readable data 604, such as binary data including a plurality of zero's and one's as shown in 604, in turn includes a set of computer instructions 606 configured to operate according to one or more of the principles set forth herein. In one such embodiment 600, the processor-executable computer instructions 606 may be configured to perform a method 608, such as the method 400, 500 or 600 of FIG. 4, 5, or 6. In another embodiment, the processor-executable instructions 606 may be configured to implement a system, such as the system 300 of FIG. 3. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or most any combination thereof to control a computer to implement the disclosed subject matter. The term "article of manufacture" as used herein is intended to encompass a computer program accessible from most any computer-readable device, carrier, or media. Of course, many modifications may be made to this configuration without departing from the scope or spirit of the claimed subject matter.

Figure 7:
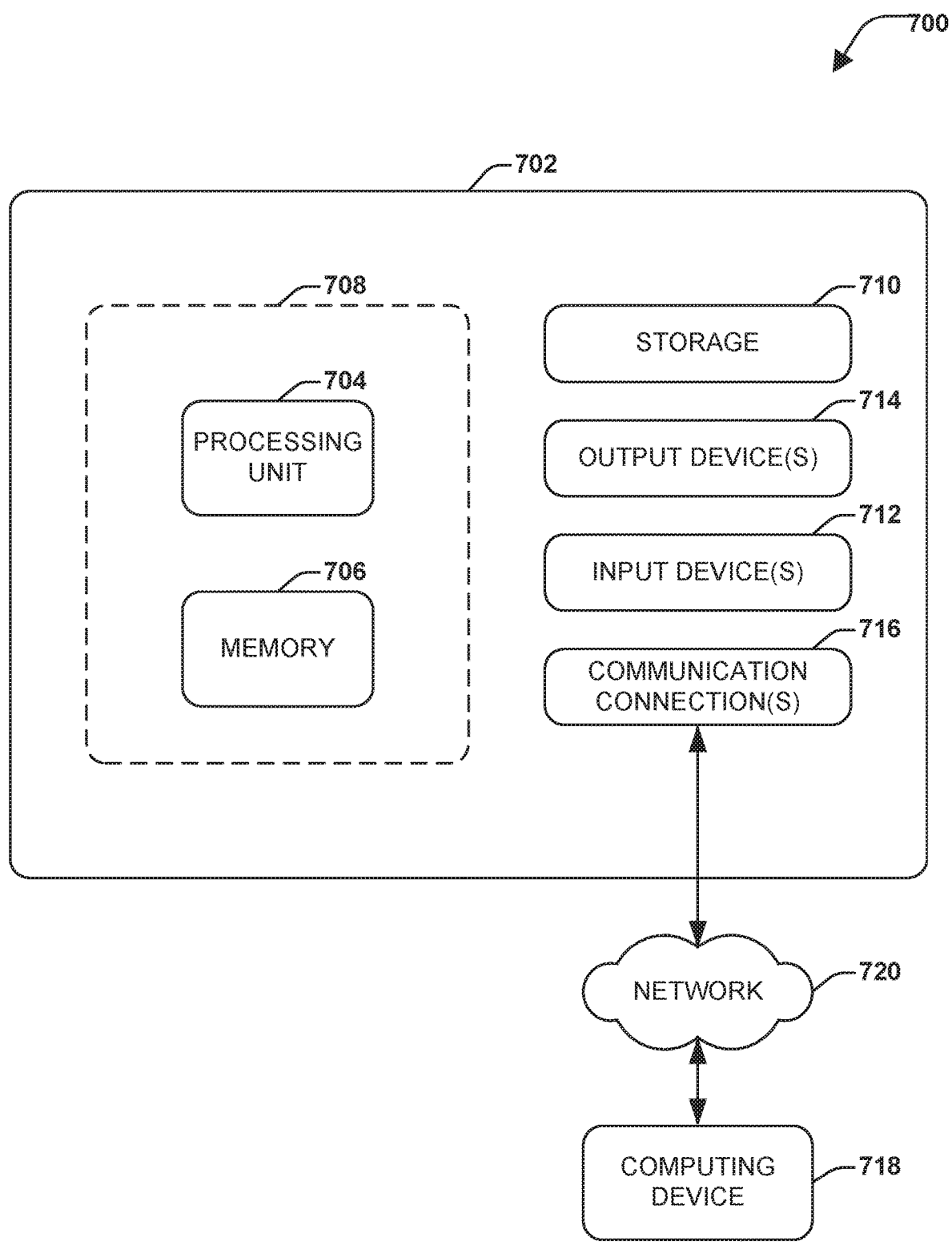
FIG. 7 is an illustration of an example computing environment where one or more of the provisions set forth herein can be implemented, according to one or more embodiments.

FIG. 7 and the following discussion provide a description of a suitable computing environment to implement embodiments of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as discussed herein. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 702 configured to implement one or more embodiments provided herein. In one configuration, computing device 702 includes at least one processing unit 704 and memory 706. Depending on the exact configuration and type of computing device, memory 706 may be volatile, such as RAM, non-volatile, such as ROM, flash memory, etc., or a combination of the two. This configuration is illustrated in FIG. 7. 7 by dashed line 708.

In other embodiments, device 702 includes additional features or functionality. For example, device 702 may include additional storage such as removable storage or non-removable storage, including, but not limited to, magnetic storage, optical storage, etc. Such additional storage is illustrated in FIG. 7 by storage 710. In one or more embodiments, computer readable instructions to implement one or more embodiments provided herein are in storage 710. Storage 710 may store other computer readable instructions to implement an operating system, an application program, etc. Computer readable instructions may be loaded in memory 706 for execution by processing unit 704, for example.

The term "computer readable media" as used herein includes computer storage media. Computer storage media includes volatile and nonvolatile, removable and non-removable media implemented in any method or technology for storage of information such as computer readable instructions or other data. Memory 706 and storage 710 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 702. Any such computer storage media is part of device 702.

Device 702 includes input device(s) 712 such as keyboard, mouse, pen, voice input device, touch input device, infrared cameras, video input devices, or any other input device. Output device(s) 714 such as one or more displays, speakers, printers, or any other output device may be included with device 702. Input device(s) 712 and output device(s) 714 may be connected to device 702 via a wired connection, wireless connection, or any combination thereof. In one or more embodiments, an input device or an output device from another computing device may be used as input device(s) 712 or output device(s) 714 for computing device 702. Device 702 may include communication connection(s) 716 to facilitate communications with one or more other devices 718, and such communication may occur over a network, for example network 720.

Although, in accordance with some aspects, the subject matter has been described herein in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has, "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for reducing attack surface item risk potential, comprising:
   a plurality of webpage/forms that receive potential attack surface items from an external source, wherein the plurality of webpage/forms communicate to a plurality of applications;
   a plurality of application services linked to a subset of the plurality of applications and that provide validation of potential attack surface items; and
   a governor that controls at least data traffic between the plurality of webpage/forms and the plurality of applications, wherein the governor controls operation of the one or more applications such that
      potential attack surface items are identified and matched to a subset of the plurality of application services based at least in part upon a pre-determined rule,
      validation is confirmed for the identified potential attack surface items, and
      wherein, upon confirmation, permits an application process of the subset of the plurality of applications to continue, else applies a preselected control to the subset of the plurality of applications limiting internal exposure to the identified potential attack surface items; and
      wherein the governor determines and applies validating application services associated with a first set of the plurality of applications to a second set of the plurality of applications for controlling operations in cases that more than one application from the first set and the second set is associated with a subset of the plurality of webpage/forms.

2. The system of claim 1, wherein the one or more potential attack surface items are data, data fields, and/or data types associated with one or more webpage/forms that reflect items that are submitted from external to the system via a user/client computing device.

3. The system of claim 1, further comprising a data store that stores inspection, identification, cataloguing, tracking and verification results.

4. The system of claim 3, wherein the data store further stores:
   predetermined rules for matching validating application services to potential attack surface items, and
   predetermined selected control commands for cases in which validations are deemed not proper per the predetermined rules.

5. The system of claim 4, wherein the system provides that the data store further stores predetermined validators that may be matched to potential attack surface items, and further that the system augments one or more applications to permit the application to properly validate against potential surface attack items.

6. The system of claim 1, wherein the governor comprises a profiler that examines a plurality of application profiles of the plurality of applications as well as examines the plurality of applications beyond the respective application profile and that application examination obtains information typically located within the plurality of application profiles.

7. The system of claim 1, wherein the one or more webpage/forms receives internally generated potential attack surface items and the governor provisions micro services.

8. The system of claim 7, wherein micro service provisions comprise operations to inspect, identify, catalogue and/or track application validation protocols, and wherein the micro service provisions provide are applied in a development phase of one or more applications.

9. A system for governing a plurality of webpage/form applications, comprising:
   a profiler that:
      inspects system components to determine attack surface item potential occurrences,
      identifies and catalogues potential attack surface items associated with the potential occurrences,
      identifies and catalogues presence and absence of calls to a plurality of validating application service items within the plurality of webpage/form applications and a plurality of webpage/forms that may receive, from an external source, the potential attack surface items,
      tracks and verifies items and actions, and
      logs determinations, identification, catalogings, trackings and verifications in a data store; and
   a validator component that:
      sets a convention for the system,
      enforces the use of the convention for the plurality of webpage/form applications within the system, and
      operates a certificate/signatory component that controls the plurality of webpage/form applications through attestations of validations occurring for the attack surface item potential occurrences;
         wherein for potential attack surface items being validated, the validator component provides permission for the plurality of webpage/form applications to continue, else the validator component applies a predetermined control limiting internal exposure to the potential attack surface items; and
      determines and applies a subset of the validating application service items from a first set of the plurality of webpage/form applications to a second set of the plurality of webpage/form applications, for controlling operations in cases that more than one webpage/form application is associated with a subset of the plurality of webpage/forms.

10. The system of claim 9, wherein the plurality of potential attack surface items comprise data, data fields, and/or data types associated with the plurality of webpage/forms that are designed to be completed by an external user or client.

11. The system of claim 9, wherein the setting of a convention for the system involves a data structure control component that controls content and use of Xheader elements and that enforces the controls on system components.

12. The system of claim 11, wherein the system components upon which controls are enforced comprise the plurality of webpage/forms, the plurality of webpage/form applications, and the validating application service items.

13. The system of claim 9, wherein the certificate/signatory component generates unique digital signature requests for identified validating application service items, forwards the signature requests to the validating application service items, and processes returned digitally signed requests as attestations of validations having been performed.

14. The system of claim 9, wherein the data store further stores predetermined rules for matching validating application services to attack surface item potential occurrences and predetermined selected control commands for cases in which validations are deemed not proper per the predetermined rules.

15. The system of claim 9, wherein the system provides that the data store further stores predetermined validating application service items that may be matched to attack surface item potential occurrences, and a validator component that augments a subset of the plurality of webpage/form applications to permit the subset to properly validate against attack surface item potential occurrences.

16. A method of for reducing attack surface item risk potential, comprising:
   interrogating, by a governor, a plurality of applications and a plurality of webpage/forms associated with the applications,
   demarcating, by the governor, potential attack surface items within the plurality of webpage/forms; and
   resolving, by the governor, validators verifying application treatment of potential attack surface items wherein the resolving comprises:
      matching predetermined validators to the application treatment,
      enforcing a control convention that controls the plurality of applications, and
      determining that validating, by the predetermined validators, has occurred,
         wherein if validators have validated demarcated potential attack surface items, permitting, by the governor, the plurality of applications to proceed, else applying, by the governor, predetermined selected controls to the plurality of applications and the potential attack surface items; and
         wherein determining comprises applying a subset of validating application service items from a first set of the plurality of applications to a second set of the plurality of applications, for controlling operations in cases that more than one of the plurality of applications is associated with a subset of the plurality of webpage/forms.

17. The method of claim 16 wherein the control convention is enforced upon system components further comprising the one or more webpage/forms and the validators.

18. The method of claim 16, wherein the determining that validating, by the predetermined validators has occurred comprises:
   generating unique digital signature requests for the predetermined validators,
   forwarding the signature requests to the predetermined validators, and
   processing the returned digitally signed requests as attestations of validations having been performed by the predetermined validators.

* * * * *